(12) United States Patent
Belu

(10) Patent No.: US 9,081,786 B1
(45) Date of Patent: *Jul. 14, 2015

(54) SYSTEMS AND METHODS FOR CREATING SELF-EXTRACTING FILES

(71) Applicant: Intel Corporation, Santa Clara, CA (US)

(72) Inventor: Sabin Belu, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/839,939

(22) Filed: Mar. 15, 2013

Related U.S. Application Data

(63) Continuation of application No. 09/818,134, filed on Mar. 27, 2001, now Pat. No. 8,402,005.

(51) Int. Cl.
  *G06F 17/00* (2006.01)
  *G06F 17/30* (2006.01)
  *G06F 13/00* (2006.01)

(52) U.S. Cl.
  CPC ...... *G06F 17/30129* (2013.01); *G06F 17/3007* (2013.01); *G06F 17/30073* (2013.01); *G06F 17/30079* (2013.01); *G06F 17/30153* (2013.01)

(58) Field of Classification Search
  CPC ............ G06F 17/00; G06F 17/30; G06F 9/44
  USPC .................. 717/169, 171–183; 707/609, 693, 707/670–673, 804, 821–831; 711/161–162
  See application file for complete search history.

(56) References Cited

U.S. PATENT DOCUMENTS

| | | | | |
|---|---|---|---|---|
| 5,481,701 A | * | 1/1996 | Chambers, IV | 711/111 |
| 5,613,123 A | * | 3/1997 | Tsang et al. | 713/1 |
| 5,632,002 A | * | 5/1997 | Hashimoto et al. | 704/231 |
| 5,794,018 A | * | 8/1998 | Vrvilo et al. | 713/400 |
| 5,819,115 A | * | 10/1998 | Hoese et al. | 710/68 |
| 5,835,759 A | * | 11/1998 | Moore et al. | 713/1 |
| 5,913,062 A | * | 6/1999 | Vrvilo et al. | 719/321 |
| 5,991,753 A | * | 11/1999 | Wilde | 1/1 |
| 6,118,899 A | * | 9/2000 | Bloomfield et al. | 382/233 |
| 8,402,005 B2 | * | 3/2013 | Belu | 707/693 |

FOREIGN PATENT DOCUMENTS

WO        02/17068      *   2/2002

* cited by examiner

*Primary Examiner* — Srirama Channavajjala
(74) *Attorney, Agent, or Firm* — AEON Law; Adam L.K. Philipp

(57) ABSTRACT

Systems and methods are disclosed for creating a self-extracting file from any given input file type with minimum user interaction. The systems and methods include, in response to a single action, receiving an input file, compressing the input file, transforming the compressed input file into a self-extracting file, configuring the self-extracting file to, upon execution, decompress and launch the original input file with the appropriate application software, and generating a name for the resulting self-extracting file. The systems and methods may operate directly on the input file regardless of file type, transforming the input file into an executable file and increasing the ease and speed of creating a self-extracting file that automatically launches the original input file upon execution of the self-extracting file.

26 Claims, 6 Drawing Sheets

SYSTEMS AND METHODS FOR CREATING SELF-EXTRACTING FILES

FIELD OF THE INVENTION

The present invention relates to data compression, and more specifically, relates to a system and method for creating self-extracting files.

BACKGROUND

In order to speed up data transmissions and minimize storage requirements, a variety of compression methods have been used to reduce the size of a given input data file by removing redundancy from the original data in the input file. Such redundancy is removed by replacing (or encoding) symbols or strings of symbols with numerical codes or combinations of numeric codes and symbols. Thus, the resulting output file is smaller than the original input file. The major categories of compression methods include: run length encoding (RLE) methods, statistical methods, dictionary methods, and transforms.

RLE methods compress data by replacing consecutive occurrences of a symbol with one code containing the symbol and the number of the consecutive occurrences of the symbol. Statistical methods represent symbols and strings of symbols using codes of variable length, where shorter length codes are assigned to the more frequently occurring symbols or strings of symbols. Dictionary methods compress data by replacing strings of symbols with a token that indexes to the string in an accompanying dictionary. An example of a well-known dictionary method is LZ77, described on pages 154-157 of *Data Compression: The Complete Reference* by David Salomon, Second Edition, 2000. Transforms use the concept of a mathematical transform to compress image data by transforming correlated pixels to a decorrelated representation of the pixels. For a more detailed description of data compression methods, please refer to *Data Compression: The Complete Reference* by David Salomon, Second Edition, 2000.

Compression methods may be used by programs to compress multiple files into a single file, called an archive. ARC is an example of a program capable of compressing a collection of files into an archive. PKZIP, a variation of ARC, is another example of a compression/archive program. For a more detailed description of ARC and PKZip, please refer to pages 206-211 of *Data Compression: The Complete Reference* by David Salomon, Second Edition, 2000.

While a compressor (or encoder) compresses the original data in the input file into a smaller, lower-redundancy output file, a decompressor converts data in the opposite direction, restoring the lower-redundancy output file to its original (i.e., uncompressed) form. Thus, in order to reconstruct the data to its original form, the system or individual receiving the compressed output file must have a decompressor utility program capable of reading and restoring the compressed output file. To facilitate the decompression of files, many compressors allow the user to specifically create a self-extracting file, which when executed, decompresses the compressed output file or files.

Users may create self-extracting files by expressly specifying that a binary decompression engine be attached to an already existing compressed input file or archive. The self-extracting file is therefore an executable file that knows how to operate on the file or archive (i.e., list, test, extract) without help from an external decompressor utility. One problem with this system is that the process of creating such a self-extracting archive is cumbersome and requires multiple steps, especially if dealing with only a single file. In addition, to configure the self-extracting file to automatically launch a particular file upon decompression, the user must take yet additional steps.

Executable (EXE) compressors, such as the LZEXE program written by Fabrice Bellard, are special purpose compression utilities designed to compress PC EXE files, which can then be decompressed and executed with one command. Other EXE compressors include WWPack32, EXElite, and PETITE. Rather than write the decompressed file to disk, the decompressor for the EXE compressors loads the file into memory and launches the file from the memory location where it was extracted. For a more detailed description of EXE compressors, please refer to page 212 of *Data Compression: The Complete Reference* by David Salomon, Second Edition, 2000. One problem with EXE compressors is that they operate only with executable files (e.g., ".exe" and ".dll" files). Thus, EXE compressors can not compress other files that do not contain executable code.

SUMMARY OF THE INVENTION

The present invention provides systems and methods for creating, in response to a single action, a self-extracting file from any input file, wherein the input file is automatically launched upon execution of the self-extracting file. The systems and methods according to one embodiment increase the speed and ease with which a self-extracting file can be created from any input file. The methods provide for the creation of a self-extracting file from an input file. The input file may be of any file type, including, without limitation, a text file, a audio file, a graphics file, a video file, a executable file, etc. The systems include modules configured to receive an input file, open and name an output file, transform the output file into an executable file, attach a loader to the executable file to launch the input file upon execution of the executable file, and compress the input file data.

A method for creating, in response to only a single action by a user, a self-extracting file. The method comprises receiving, from a user, an input file to be used in creating a self-extracting file, and, without further action by the user, creating a self-extracting file using the input file. The input file is automatically launched upon execution of the self-extracting file.

A method for creating, in response to a single action, a self-extracting file from an associated input file, wherein the associated input file is automatically launched upon execution of the self-extracting file, and wherein a user is not required to separately choose a data compression method, create a compressed archive using the chosen compression method, select an input file to be launched upon decompression of the compressed archive, and create a self-extracting file from the compressed archive. The method comprises receiving an input file to be used in creating a self-extracting file, wherein the file may be of any file type, and in response to only a single action, creating a self-extracting file from the input file. The input file is automatically launched upon execution of the self-extracting file.

A method for creating a self-extracting file comprises receiving an input file to be used in creating a self-extracting file, wherein the input file is of any file type, and automatically creating a self-extracting file using the received input file.

A method for creating an executable file. The method comprises, in response to only a single action, creating a self-extracting file from any input file, wherein the input file may be of any file type, and wherein the input file will be automatically launched upon execution of the self-extracting file.

A method of creating a self-extracting file. The method comprises displaying a first screen allowing a user to specify an input file to be converted to a self-extracting file, receiving the input file specified by the user, wherein the received input file is automatically configured as a self-extracting file and wherein the input file will be automatically launched upon execution of the self-extracting file, and displaying a second screen including a link to the self-extracting file created from the user specified input file.

A system for creating a self-extracting file. The system comprises a receiving module configured to receive an input file, wherein the input file received may be of any file type and wherein the input file includes an associated filename, and a naming module configured to create and name an output file, wherein the output filename is generated from the associated filename of the input file and wherein the naming module receives the input file from the receiving module. The system further comprises a self-extracting module configured to transform the output file into a executable file, wherein the self-extracting module receives the input file and the output file from the naming module, and a loader module configured to setup the executable file to launch the input file upon execution of the executable file, wherein the loader module receives the executable file and the input file from the self-extracting module. Additionally, the system comprises a compressing module configured to compress the input file and attach the compressed input file to the executable file, wherein the compressing module receives the input file and the executable file from the loader module.

A system for creating, in response to a single action, a self-extracting file from an associated input file, wherein the associated input file is automatically launched upon execution of the self-extracting file, and wherein a user is not required to separately choose a data compression method, create a compressed archive using the chosen compression method, select an input file to be launched upon decompression of the compressed archive, and create a self-extracting file from the compressed archive. The system comprises means for receiving an input file to be compressed, wherein the input file may be of any file type, means for compressing the received input file according to a data compression method, and means for creating, in response to only a single action by a user, an executable file from the compressed input file, wherein the compressed input file will be automatically decompressed and launched upon execution of the executable file.

A data format, stored in a computer readable medium. The data format comprises a compressed input data portion including data compressed according to a data compression method, and an archive header portion, wherein the archive header portion includes information about the compressed input data portion. The data format further comprises a self-extracting stub portion, wherein the self-extracting stub portion is automatically attached to the compressed input data portion and the archive header portion, and wherein the self-extracting stub portion includes a decompression engine to decompress the compressed input data portion and a loader to launch the decompressed input data portion.

A method for creating, in response to a single action, a self-extracting file. The method comprises a step for receiving an input file to be used in creating a self-extracting file, wherein the input file is of any file type; and a step for automatically creating a self-extracting file using the received input file.

A method for creating, in response to only a single action, an executable file. The method comprises receiving an input file to be used in creating an executable file, wherein the input file may be of any file type; and without further instruction, creating an executable file using the received input file, wherein the executable file includes a compressed copy of the input file, and wherein the compressed copy of the input file is automatically decompressed and launched upon execution of the executable file.

A process for producing, in response to a single action, a computer file. The process comprises receiving an input file; opening an output file; writing a decompression engine to the output file for decompressing compressed data; and writing loader code to the output file for launching the input file with the appropriate application software for handling the input file. The process further comprises writing an archive header to the output file, wherein the archive header includes information relating to the input file; compressing the input file according to a data compression method; updating the archive header to include information about the compressed input file; and closing the output file.

A method for creating, in response to only a single action, an executable file. The method comprises receiving an input file to be used in creating an executable file, wherein the input file may be of any file type; and without further instruction, creating an executable file using the received input file. The executable file further comprises a compressed input data portion including data compressed according to a data compression method; an archive header portion including information about the compressed input data portion; and a stub portion, wherein the stub portion is automatically attached to the compressed input data portion and the archive header portion, and wherein the stub portion includes a decompression engine to decompress the compressed input data portion and a loader to launch the decompressed input data portion.

A method for using an executable file. The method comprises in response to a first action, creating an executable file from any input file, wherein the executable file includes a compressed copy of the input file, and wherein the executable file includes code to decompress and load the compressed input file. The method further comprises, in response to a second action, launching the executable file, wherein the compressed input file is decompressed, and wherein the decompressed input file is loaded with appropriate application software.

A method for creating a self-extracting file. The method comprises receiving, in response to a single action, an input file to be used in creating a self-extracting file, and without further instruction, creating a self-extracting file using the input file, wherein the input file is automatically loaded upon execution of the self-extracting file Certain aspects, advantages and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

These and other features of the invention will now be described with reference to the drawings summarized below. These drawings and the associated description are provided to illustrate a preferred embodiment of the invention, and not to limit the scope of the invention.

Throughout the drawings, reference numbers are re-used to indicate correspondence between referenced elements. In addition, the first digit of each reference number indicates the figure in which the element first appears.

DETAILED DESCRIPTION

I. Overview

Figure 1:
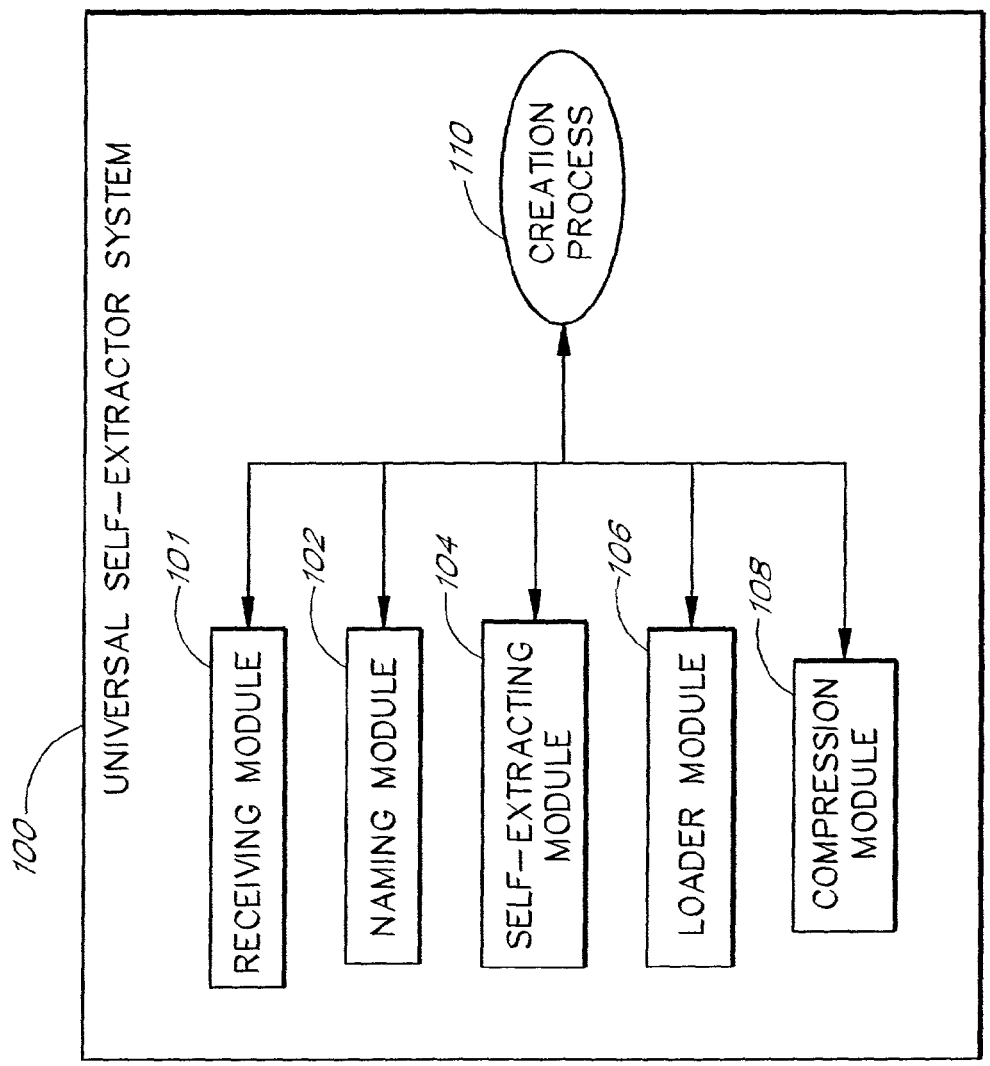
FIG. 1 illustrates a high-level block diagram according to one embodiment of the universal self-extractor system.

The present invention provides methods and systems for creating a self-extracting file from any input file with minimal interaction from a user. One embodiment involves, in response to a single action by the user, compressing an input file, attaching a decompression engine, configuring the file to be launched upon execution, and naming the self-extracting file. The input file may be of any file type, including, but not limited to, image files, text files, audio files, video files, and program files. Using the input file, the methods produce, without needing further instruction, a self-extracting file that, upon execution, automatically extracts the input file data into a temporary file and launches the temporary file (i.e., the input file) with the appropriate application software for that file type.

The systems and methods may be implemented in a variety of embodiments. In one embodiment, the input file is advantageously provided, either directly or indirectly, by a computer user specifying the input file. The user specifies the input file using a frame or display screen, which may be one or more web pages, windows, or other screens or views produced by proprietary software. In another embodiment, the input file may be specified using voice recognition software. In other embodiments, the input file is submitted by another software routine making a call to the creation methods. In further embodiments, the input file is submitted to the creation method through the use of third-party software applications or routines.

In one embodiment, a user submits the name of a file to be converted into a universal self-extracting file to independent application software running on the user's computer. In another embodiment, the systems and methods are included as a component of other application software, such as an email application. In such an embodiment, the method may be invoked, for example, when a user clicks on a button to attach a file to an email message. The attached file is converted into a universal self-extracting file as a part of the attachment process, without necessarily requiring further user input, though it is recognized that in other embodiments, the user may be queried for further information. Alternatively, in one embodiment, the method may be incorporated into the save/open functionality of an existing application, such that each file saved to a disk is converted into a universal self-extracting file before it is written to the disk. For example, if a user is creating a bitmap and selects the save option from the bitmap creation program (e.g., Paint.exe), the file saved to the disk is automatically converted into a universal self-extracting file. In another embodiment, the method is implemented in a web-based environment.

For purposes of illustration, the systems and methods are described herein in the context of independent application software running on a user's computer. Throughout the description, reference will be made to various implementation-specific details of the independent application software embodiment. These details are provided in order to fully illustrate embodiments of the invention, and not to limit the scope of the invention. The scope of the invention is set forth in the appended claims. The various process steps described herein are preferably performed by or using software executed by one or more general-purpose computers, although the process steps could alternatively be embodied in-whole or in-part within special purpose hardware.

II. Universal Self-Extractor System

FIG. 1 illustrates one embodiment of a high-level block diagram of a universal self-extractor system 100. The universal self-extractor system 100 includes a receiving module 101, a naming module 102, a self-extracting module 104, a loader module 106, a compression module 108, and a creation process 110.

As used herein, the word module refers to logic embodied in hardware or firmware, or to a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is contemplated that the modules may be integrated into a fewer number of modules. One module may also be separated into multiple modules. The described modules may be implemented as hardware, software, firmware or any combination thereof. Additionally, the described modules may reside at different locations connected through a wired or wireless network, or the Internet.

As used herein, and as understood by one of ordinary skill in the art, references to the "sending" or "receiving" of a file (i.e., such as the input file 202) is understood to include the actual sending of a file and/or the sending of a pointer to a memory address and/or physical location where the file is located.

In one embodiment, the universal self-extractor system may be implemented in a user computer. In one embodiment, the user computer is a conventional general purpose computer using one or more microprocessors, such as, for example, a Pentium processor, a Pentium II processor, a Pentium III processor, a Pentium IV processor, a Pentium Pro processor, an xx86 processor, an 8051 processor, a MIPS processor, a Power PC processor, or an Alpha processor. In one embodiment, the user computer runs an appropriate operating system, such as, for example, Microsoft® Windows® 3.X, Microsoft® Windows® 98, Microsoft® Windows® NT, Microsoft® Windows® CE, Microsoft® Windows® 2000, Microsoft® Windows® ME, Palm Pilot OS, Apple®, MacOS®, Disk Operating System (DOS), UNIX, Linux®, or IBM® OS/2® operating systems.

In other embodiments, the user computer may, for example, be a computer workstation, a local area network of individual computers, an interactive television, a set top box, an interactive kiosk, a personal digital assistant, an interactive wireless communications device, a handheld computer, a telephone, a router, a satellite, a smart card, an embedded computing device, a cellular phone, a watch, or the like.

A. Receiving Module

The receiving module 101 receives an input file 202 (FIG. 2) for use in creating a universal self-extracting file 204. The input file 202 may be received either directly or indirectly from a computer user or from another software module or routine. After receiving the input file 202, the receiving module 101 sends the received input file to the naming module 102.

B. Naming Module

The naming module 102 uses the received input file 202 to begin creating a universal self-extracting file 204. For more information on the sample file formats for the universal self-extracting file 204, please refer to the section below entitled "Sample Data Format," which describes FIG. 2 and FIG. 3. The naming module 102 generates a name for the universal self-extracting file 204. After receiving the input file 202, the naming module 102 opens and names an output file (i.e., a universal self-extracting file), which initially does not contain all of the file format portions identified in FIG. 2 and FIG. 3 as portions of the resulting universal self-extracting file 204 after completion of the creation process 110.

In one embodiment, the naming module 102 receives the input file 202 from a computer user. In another embodiment, the naming module 102 may receive the input file 202 from another software module included in other application software or from an external source. For example, in one embodiment, the input file 202 may be received from a module of an email application. The naming module 102 generates a name for the universal self-extracting file 204 based on the name and/or file type of the input file 202 received. In one embodiment, a portion of the generated name may include a name identifying the file as being a file formed in accordance with the methods herein. For example, the universal self-extracting file 204 may be named based on the following pattern: FILENAME_FILEEXTENSTION_LIPON.EXE, where "lipon" is the portion of the generated name chosen to indicate that the file has been formed in accordance with the inventive methods. Thus, if the input file 202 is named "house.bmp," the resulting universal self-extracting file 204 would be named "house_bmp_lipon.exe." In an additional embodiment, the universal self-extracting file 204 may be named based on the following pattern: FILENAME_FILEEXTENSTION.EXE. Thus, if the input file 202 is named "house.bmp," the resulting universal self-extracting file 204 would be named "house_bmp.exe." In another embodiment, the generated name may be based on additional file information, such as the name and file size of the input file 202. In further embodiments, the naming module 102 may query the user for the name of the file 204. It is recognized that a variety of naming techniques may be used. After opening and naming the universal self-extracting file 204, the naming module 102 sends the file to the self-extracting module 104. In one embodiment, the file does not yet include the compressed input file data portion 206, the archive header portion 208, or the universal self-extracting stub portion 210 (see FIG. 2 and FIG. 3).

B. Self-Extracting Module

The self-extracting module 104 receives the named universal self-extracting file 204 from the naming module 102 and attaches executable code and a decompression engine as a stub, making the resulting file a self-extracting file. The executable code allows a computer operating system to recognize and load the self-extracting file into memory. In one embodiment, the added executable code is Win32 executable code, which is wrapped around the code from the compiler to generate an executable file.

In one embodiment wherein a compression module 108 (see section below entitled "Compression Module") uses the same compression method for every input file type, the self-extracting module 104 always attaches the same decompression engine to the file. For example, if the compression module 108 always uses the LZ77 compression algorithm, the decompression engine attached to the file is always the LZ77 decompression algorithm. In another embodiment, the decompression engine attached depends on the compression method to be used by the compression module 108 in compressing the input file data. In this embodiment, the self-extracting module 104 may attach a different decompression engine for image input files than is attached when the input file is a text file.

After attaching the executable code and decompression engine, the self-extracting module 104 sends the file to the loader module 106. The file includes the executable code and the attached decompression engine.

C. Loader Module

The loader module 106 receives the file, which includes the executable code and the attached decompression engine, from the self-extracting module 104 and configures the file to be automatically launched after decompression of the compressed input file data by the attached decompression engine. The loader module 106 attaches a loader to the universal self-extracting file 204 as a part of the universal self-extracting stub portion 210.

In one embodiment, the loader attached by the loader module 106 includes source code configured to behave differently for different input file 202 types. In another embodiment, the loader attached by the loader module 106 depends on the file type of the input file 202. Thus, a different loader is attached for different input file 202 types. For example, in the case that the input file 202 is a Dynamic Link Library (DLL) file, the loader module 106 may use script codes to cause the DLL's function to be called after execution of the universal self-extracting file 204. In other embodiments, the loader may interpret scripts, causing the loader to function differently (i.e., in loading and/or unloading) for different input file 202 types. In further embodiments, the script commands and functions of the loader may be implemented as binary script codes (i.e., 0x0E for LOAD, etc.), located as a separate format portion (not shown) of the universal self-extracting file 204 and transformed to binary representations by a compiler.

In one embodiment, the loader module 106 determines whether unload and clean-up processes are needed after execution of the universal self-extracting file 204. In those cases where clean-up is needed, such as, for example, when the input file 202 is a DLL file, the loader module 106 configures the universal self-extracting file 204 to unload and clean-up the temporary extracted DLL file after the user is finished using the file.

It is recognized that in other embodiments, the loader module 106 may configure the file to be launched in response to other action, such as, for example, in response to user input, another module, and so forth. After configuration of the file to automatically launch upon decompression, the loader module 106 sends the universal self-extracting file, which includes the universal self-extracting stub portion 210, to the compression module 108.

D. Compression Module

The compression module 108 receives the universal self-extracting file 204, which includes the universal self-extracting stub portion 210 and the input file data to be compressed, from the loader module 106. The compression module 108 applies a compression method to the input file 202 to produce a compressed input file data portion 206.

In one embodiment, the compression module 108 applies the same compression method for each input file 202 regardless of file type, such that text and image files are treated the same by the compression module 108. In another embodiment, the compression module 108 applies one of several compression methods based on the type of file being compressed by the compression module 108. For example, the compression module 108 may use different compression methods for text files than for image files. In such an embodiment, the compression module 108 may select the compression method to be used based on the file extension of the input file 202 or through use of an examination sub-module (not shown) to analyze the data of the input file 202.

After the input file data has been compressed, the compression module 108 attaches an archive header portion 208 to the compressed input file data portion 206. The resulting universal self-extracting file 204 now includes the universal self-extracting stub portion 210, the archive header portion 208 and the compressed input file data portion 206.

E. Creation Process

The creation process 110 creates a universal self-extracting file 204 from an input file 202. For a detailed description of the creation process 110, please refer to the section entitled "Universal Self-Extraction System Process."

III. Sample Data Format

Figure 2:
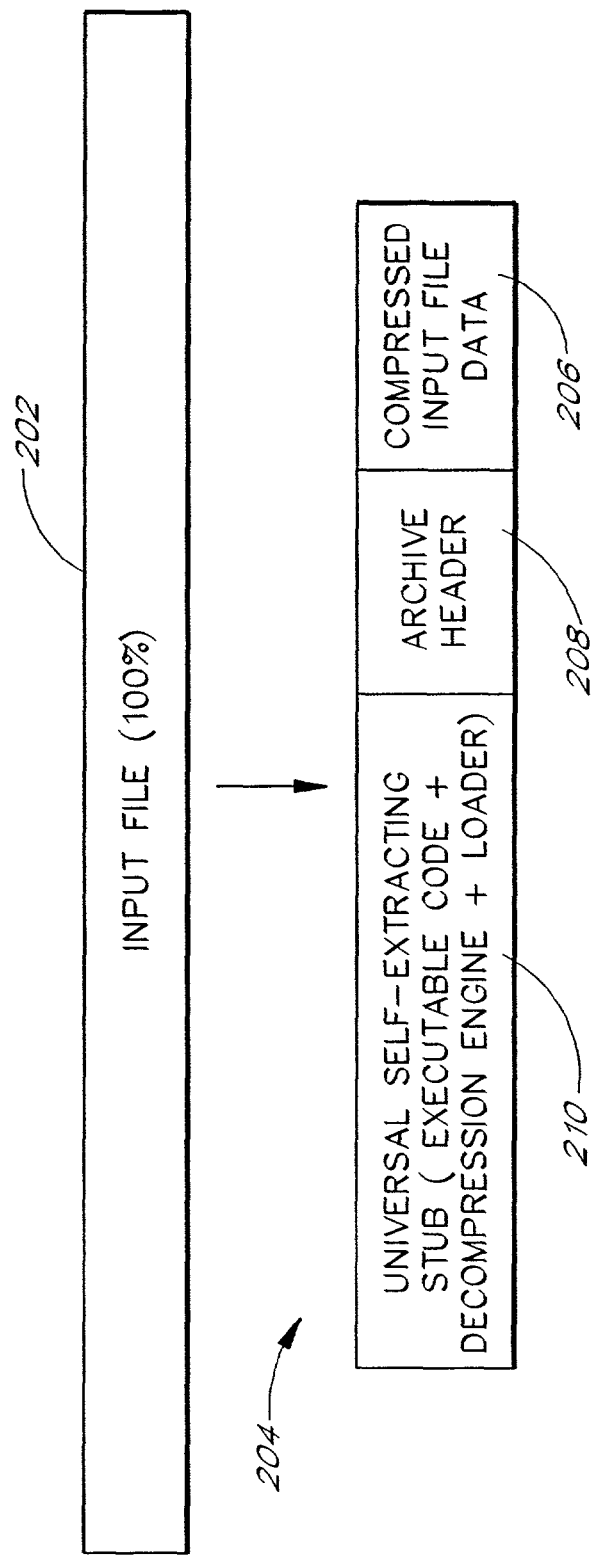
FIG. 2 illustrates a file structure of a self-extracting output file produced in accordance with one embodiment of the invention.

FIG. 2 illustrates one embodiment of a sample data format for the universal self-extracting file 204. Given an input file 202, the systems and methods produce a universal self-extracting file 204, which includes a compressed input file data portion 206, a archive header portion 208, and a universal self-extracting stub portion 210 as indicated below:

UNIVERSAL SELF-EXTRACTING STUB PORTION(EXECUTABLE CODE+DECOMPRESSION ENGINGE+LOADER)+ARCHIVE HEADER PORTION+COMPRESSED INPUT FILE DATA PORTION=UNIVERSAL SELF-EXTRACTING FILE.

In one embodiment, the compressed input file data portion 206 may be produced by the compression module 108 according to the methods described below. The archive header portion 208, which may also be created by the compression module 108, stores information about the compressed input file data portion 206. The information in the archive header portion 208 may include, for example, the file name of the input file 202, the file type of the input file, the size of the compressed input file, the actual uncompressed size of the file, and the cyclic redundancy check (or cyclic redundancy code).

The universal self-extracting stub portion 210 includes executable code, the decompression engine attached by the self-extracting module 104, and the loader attached by the loader module 106. The executable code enables the operating system of a computer to recognize and load the self-extracting file into memory, upon which execution control is passed back to the universal self-extracting stub portion. In one embodiment, the executable code is Win32 executable code. In one embodiment, the universal self-extracting stub portion 210 is a small executable file, which includes an header (i.e., such as, for example, Win32 executable code), a decompression engine, and a loader built into the universal self-extracting stub portion 210. In another embodiment, the loader is included as codes attached between the universal self-extracting stub portion and the archive header portion. In one embodiment, the codes are binary representations of script commands.

In a further embodiment, the universal self-extracting stub portion 210 includes an unloader to unload and clean-up the temporary extracted file. This embodiment is more applicable when the input file 202 includes dynamically loaded executable modules, such as with a Dynamic Link Library file (DLL). In this embodiment, the resulting universal self-extracting file includes a compressed input file data portion 206, a archive header portion 208, and a universal self-extracting stub portion 210 as indicated below:

UNIVERSAL SELF-EXTRACTING STUB PORTION(EXECUTABLE CODE+DECOMPRESSION ENGINGE+LOADER+UNLOADER)+ARCHIVE HEADER PORTION+COMPRESSED INPUT FILE DATA PORTION=UNIVERSAL SELF-EXTRACTING FILE.

Figure 3:
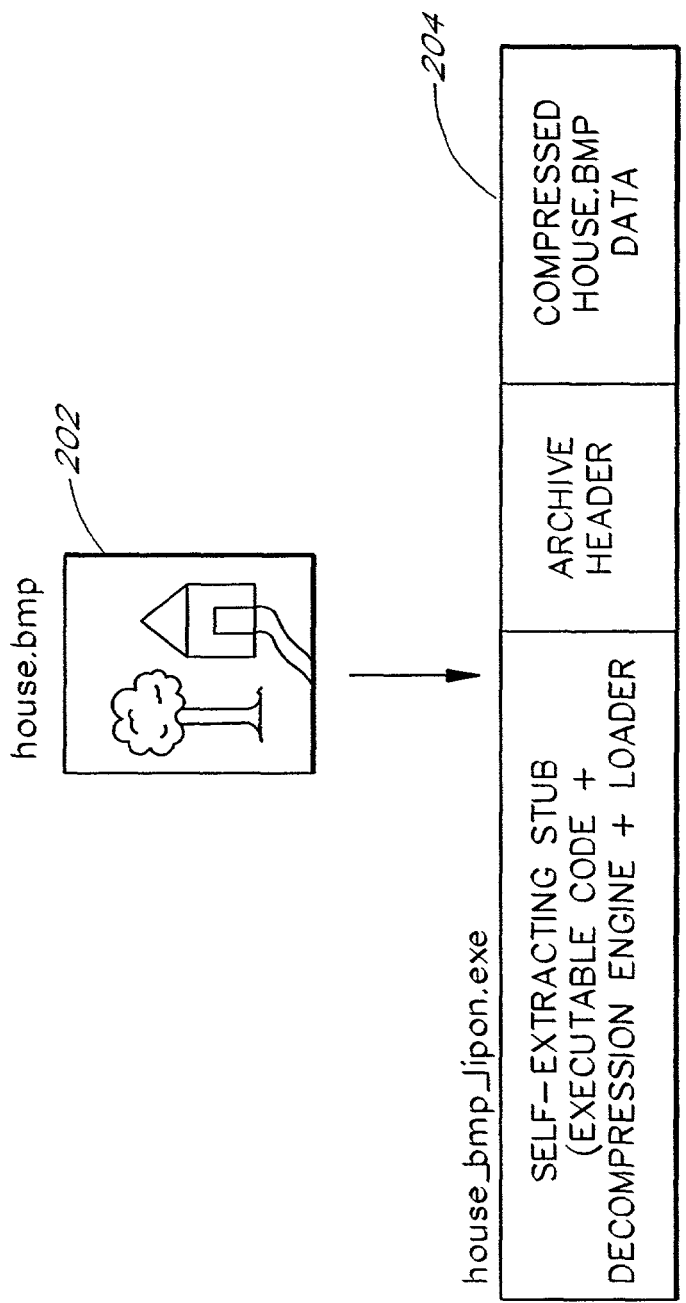
FIG. 3 illustrates an input file and its corresponding output file produced in accordance with one embodiment of the invention.

FIG. 3 provides an example of the above described sample data format, wherein a bitmap image has been converted into a universal self-extracting file to produce a universal self-extracting file 204 (named house.exe) that includes the compressed input file data portion 206, the archive header portion 208, and the universal self-extracting stub portion 210.

IV. Universal Self-Extraction Methods

By accepting all file types as an input file 202, the systems and methods provide a universal process for producing a self-extracting file 204 from any given type of input file 202 with minimal user interaction. The methods may operate directly on the input file 202. In one embodiment, multiple input files 202 are transformed into self-extracting files according to the universal self-extraction method, with each input file 202 transformed into a separate self-extracting file 204. Thus, if N input files 202 are entered by the user, the universal self-extraction method will produce N self-extracting files 204. In another embodiment, the methods may work directly with one or more input files 202 to produce one self-extracting file 204, where one or more of the input files 202 are launched upon execution of the universal self-extracting file 204.

As indicated above, the methods are described herein, for illustration purposes only, in the context of independent application software running on a user's computer. It will be appreciated by one of ordinary skill in the art that the methods may also be implemented as a component of other software applications, including, but not limited to email applications, text-based applications (such as word processors), image-based applications (such as graphics programs), video/audio-based applications (such as RealSystem® products), web-based applications (such as webpage creation/display applications), and so forth.

A. Creation Process

Figure 4:
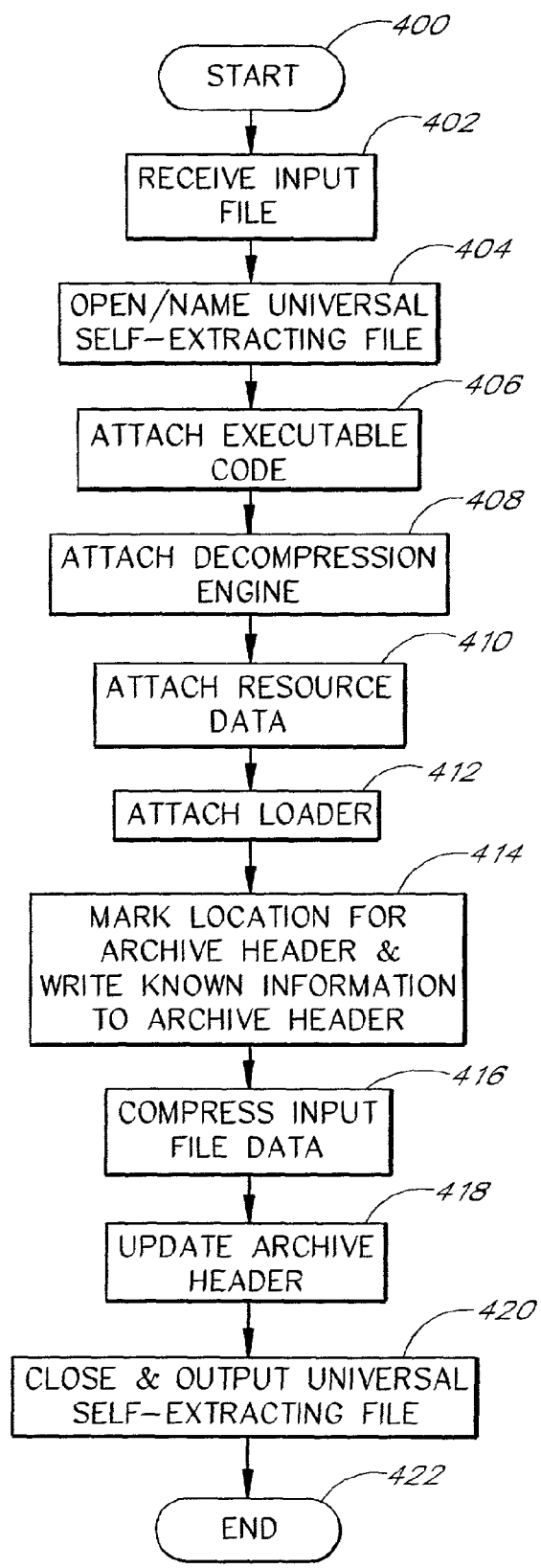
FIG. 4 illustrates a flow chart for producing a self-extracting output file according to one embodiment of the invention.

One embodiment of a creation process 110 will now be described in further detail with reference to FIG. 4. Beginning at a start state 400, the creation process proceeds to the next state 402, wherein an input file 202 is received. In state 404, the universal self-extracting file 204, which does not yet include the universal self-extracting stub portion 210, archive header portion 208, or compressed input file data portion 206, is initially opened (i.e., created) and named. The universal self-extracting file 204 is also referred to as an output file during the creation process. In this state, the output file, or the universal self-extracting file 204, is named by the universal self-extractor system 100. In one embodiment, the name is generated based on the name and/or file type of the original input file 202 received by the compression module 108. For example, the name of the universal self-extracting file 204 may be generated based on the following pattern: FILENAME_FILEEXTENSTION.EXE. Thus, if the input file 202 is named "house.bmp," the produced universal self-extracting file 204 would be named "house_bmp.exe." In another embodiment, the generated name may be based on additional file information. In one embodiment, if the generated name for the self-extracting file 204 already exists, the existing file is overwritten with the newly created self-extracting file 204.

In states 406 and 408, the universal self-extracting file 204, which does not yet include the archive header portion 208 or compressed input file data portion 206, is configured as a self-extracting file by attaching a decompression engine and executable code to the file. The result is that every file is transformed into an executable file, regardless of the file type of the received input file 202. Thus, for example, a bitmap (i.e., a ".bmp" file) received as an input file 202 is automatically transformed into a self-extracting file (i.e., an ".exe" file) just as a text file (i.e., a ".txt" file) received as an input file 202 is also automatically transformed into a self-extracting file (i.e., an ".exe" file).

The executable code, attached to the universal self-extracting file 204 in state 406, allows the operating system to recognize and load the self-extracting file into memory and pass execution control back to the universal self-extracting stub. In one embodiment, the executable code is Win32 executable code. The decompression engine, attached to the universal self-extracting file 204 in state 408, allows the compressed file data portion 206 to be decompressed without help from an external decompression utility. In one embodiment, the decompression engine decompresses the compressed file data portion 206 to a temporary file. In one embodiment, the decompression engine attached is always the same, no matter the file type. In one embodiment, it may be desirable to have the decompression engine as small as possible to reduce the size of the output universal self-extracting file 204, whereas in other embodiments, other factors may be considered when selecting the decompression engine such as, for example, compression ratio, speed, file size, and so forth. In further embodiments, the decompression engine attached may depend on a pre-determined compression method to be used in state 416 and may vary depending on the type of the received input file 202.

In state 410, resource data is added to the universal self-extracting file 204. The resource data may include information such as a graphical icon to be displayed as the universal self-extracting file 204 icon.

A loader is attached to the universal self-extracting file 204, which does not yet contain the archive header 208 or compressed input file data 206, in state 412 to automatically launch the input file 202 upon execution of the self-extracting file. Unlike archive processes, which require that the user specifically identify which file to launch, the universal self-extractor system 100 automatically configures the universal self-extracting file 204 so that the input file 202 is launched upon decompression. In one embodiment, the loader attached depends on the file type of the input file 202. Thus, a different loader is attached for different input file 202 types. For example, the loader attached for a DLL file (or other executable routine) may be different than for another input file 202 type in that the loader is specially configured to work with a DLL file, such as by calling the DLL's exported function. In one embodiment, the loader attached also performs unload and cleanup processes on the temporary file. In another embodiment, the loader is capable of interpreting various scripts, causing the loader to function differently (i.e., in loading and/or unloading) for different input file 202 types. In another embodiment, the various script commands and functions of the loader may be implemented as binary codes (i.e., 0x0E for LOAD, etc.), which are located as a separate portion (not shown) of the universal self-extracting file 204 and transformed to binary representations by a compiler.

In state 414, a dummy archive header, marking a file location, is written to reserve space (i.e., memory is allocated as a placeholder) for the additional archive header information to be added to the universal self-extracting file 204 in state 418. The dummy archive header includes information known about the input file 202 before compression of the file data. The information may include, for example, the file name and size of the input file 202. After the input file 202 is compressed and the more information is known about the compressed input file data portion 206, the dummy archive header portion will be updated at the marked location, in state 418, with additional information, such as the size of the compressed input file data portion 206.

In state 416, the input file 202 is compressed using a standard data compression method. In one embodiment, the compression is performed using one compression method, such as LZ77 or a variant of LZ77, regardless of file type. In this embodiment, the compression method used to compress the input file data is pre-determined by the universal self-extractor system 100 so as to provide exceptional speed in decompression while also performing well in compression of the input file data. In one embodiment, the compressed data is written directly to the open universal self-extracting file 204, which was opened in state 404.

In other embodiments, the compression method used to compress the received input file 202 may vary depending on the type of input file 202 received. In one embodiment, the file type may be determined based on the file extension of the filename or on an analysis of the actual input file data received. For example, a different compression method may be used for image files, enabling lossy data compression, than is used for text files, enabling lossless data compression.

After the input file data has been compressed, the dummy archive header is updated at the appropriate marked location with information about the compressed input file data. The resulting archive header is attached to the file in state 418. The updated archive header information may include, for example, the creation date/time of the compressed input file, the size of the compressed input file, and/or the cyclic redundancy check (or cyclic redundancy code).

Finally, in state 420, the universal self-extracting file 204 is closed and returned to the user or software module invoking the method and the creation process 110 proceeds to an end state 422. It is recognized that FIG. 4 illustrates one embodiment of a creation process and that other embodiments may be used. For example, the universal self-extracting file 204 may be named after the input file 202 is compressed.

Figure 5:
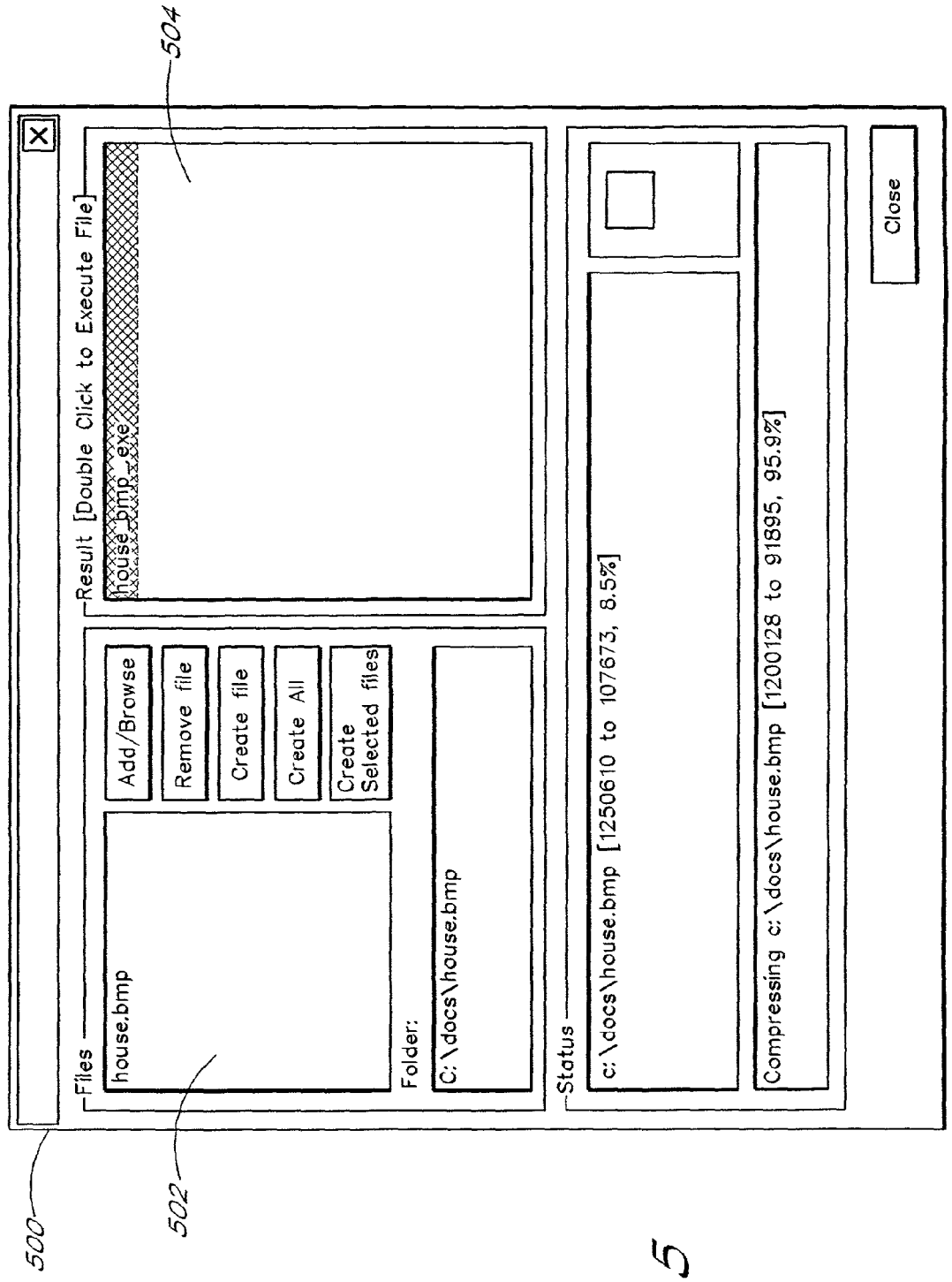
FIG. 5 illustrates a computer screen according to one implementation of the invention.

FIG. 5 illustrates one embodiment of screen 500 from an independent software application implementation of the method, wherein the software runs on a user's computer. In the exemplary screen 500, the user types or otherwise selects the name of a file to be converted into a universal self-extracting file 204 into a text window 502. The user may, for example, enter the name of the file to be converted into a universal self-extracting file 204 by selecting an add option to locate and choose the file from a list of filenames. Once the name of the file to be converted into a universal self-extracting file appears in text window 502, the user performs a single action, such as clicking a "Create File" button, to create the universal self-extracting file 204. The name of the resulting universal self-extracting file 204 is displayed in text window 504.

The user may be able to enter multiple filenames into text window 502 to be converted into one or more universal self-extracting files. In one embodiment, the method operates on a single file such that each of the multiple files will be converted into a universal self-extracting file separately. Thus, for example, if a user enters three files into text window 502 (three input files not shown), the user would still be able to with a single action, such as clicking a "Create All" button, create three universal self-extracting files. In one embodiment, the creation process 110 operates sequentially on each of the three input files, and the resulting names of the three universal self-extracting files appears in text window 504 (three files not shown). In other embodiments, the method may be used to create a single universal self-extracting file 204 from multiple input files 202, where an algorithm is used to determine which of the multiple files to launch upon execution. For example, the universal self-extracting file 204 may be configured such that each of the multiple files is launched as a separate window within the corresponding application program for that file type. Additionally, the universal self-extracting file 204 may be configured such that an ordering algorithm is used to select one particular file to be launched upon execution of the universal self-extracting file 204 (i.e., for example, select the file with the most recent date/time stamp, etc.). In another embodiment, the user may select multiple files and group the files such that each group of files would be part of a single universal self-extracting file.

B. Decompress/Launching Process

Figure 6:
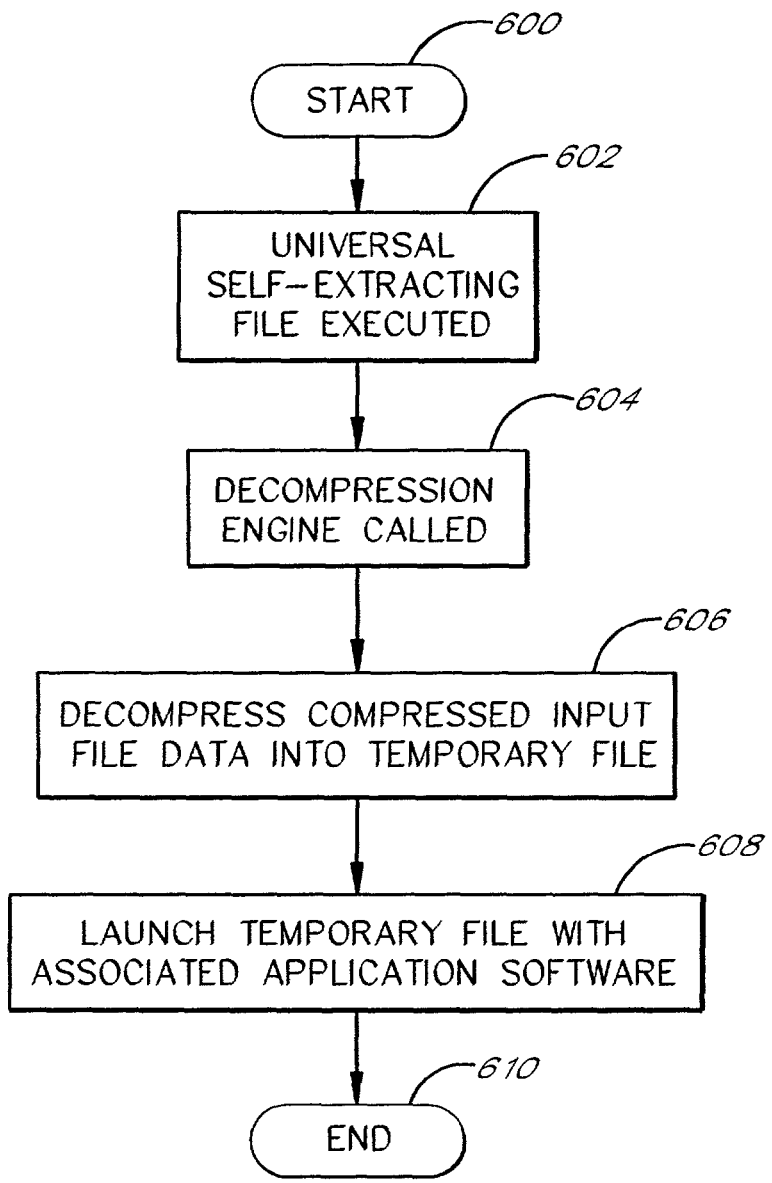
FIG. 6 illustrates a flow chart for decompressing and launching the self-extracting output file according to one embodiment of the invention.

After the universal self-extracting file 204 has been created, the universal self-extracting file 204 may be executed. One embodiment of a decompress/launching process will now be described in further detail with reference to FIG. 6. Beginning at a start state 600, the universal self-extracting file 204 is executed in state 602 when the executable code of the universal self-extracting stub portion 210 is activated. The universal self-extracting file 204 may be executed by a user selecting the file (e.g., double clicking on the file, pressing enter, etc.) or by another module executing the file. In one embodiment, the universal self-extracting file 204 may be executed as a result of a Win32 Application Program Interface (API) call.

Upon execution of the universal self-extracting file 204 in state 602, the decompression engine is called in state 604. The decompression engine, in state 606, decompresses the compressed input file data portion 206 into a temporary file. In one embodiment, the filename of the temporary file is the filename of the original input file 202. After decompression of the file to its original non-compressed form, the file is launched in state 608 with the appropriate application software for the given file. In one embodiment, for example, this is accomplished by calling the appropriate "OPEN WITH" application registered with the current operating system. Thus, the application software associated with each type of file is executed, such as, for example, notepad.exe for ".txt" files, paint.exe for ".bmp" files, word.exe for ".doc" files, realplayer.exe for ".ra" files, etc. The decompress/launching process then proceeds to an end state 610.

In another embodiment (not shown) dealing with dynamically loaded executable modules, such as with DLL files, the decompress/launching process may load the temporary DLL into memory and call the DLL's exported function. For example, a DLL may be loaded into memory, its function called, and the DLL may then pop up a user interface for an application. In this embodiment, the decompress/launching process may additionally perform unload and/or clean-up (i.e., delete) processes on the temporary DLL after the computer user is finished with the file, such as when the user terminates the application loaded via the DLL. In this embodiment, the temporary DLL is unloaded before the process proceeds to an end state. In yet another embodiment dealing with executable routines in Windows operating systems, the ShellExec function for Run32DLL.exe (a Windows operating system application tool) may be used to call an exported function of a DLL file.

V. Operation

In operation, the systems and methods for creating self-extracting files may be used in a variety of embodiments, such as independent application software running on a client machine, or as software components incorporated into third-party software.

For example, a user may desire to send a digital photograph of a child's birthday party to grandparents living in another state. Because the filesize of digital photographs may be very large, emailing a digital photograph without first compressing the image may slow down computer resources and take a long time to transmit over an Internet connection, particularly if the connection is a slower dial-up Internet connection. Thus, the user may want to compress the digital photograph before emailing the photograph to the grandparents. However, because a compressed file must be decompressed before it may be viewed again in its original format, the user may want to configure the file to be automatically decompressed whenever the grandparents select the file for viewing. Additionally, the user may want to configure the file to be automatically launched with the appropriate software for displaying the photograph when the file is selected by the grandparents for viewing.

To accomplish these functions, the user may use the universal self-extracting systems and methods to transform the digital photograph into a universal self-extracting file. Using the independent application software embodiment, the user runs a computer program with a text window for specifying the name of a file to be transformed into a universal self-extracting file. If the user is unsure of the filename or location of the digital photograph, the user may find the digital photograph using the "Add/Browse" button, as shown in FIG. 5. After selecting the "Add/Browse" button, the user locates and selects the filename of the digital photograph to be transformed into a universal self-extracting file. For example, the digital photograph of the child's birthday party may be a JPEG (Joint Photographic Experts Group) file entitled "George's Birthday.jpeg." After the user has selected the digital photograph, the filename of the selected digital photograph (i.e., "George's Birthday.jpeg") appears in text window 502. To create the universal self-extracting file, the user next selects the "Create file" button.

Once the user has selected the "Create file" button, the digital photograph is sent to the universal self-extracting system. After receiving the file, the universal self-extracting systems and methods use the filename of the digital photograph to create a name for an output file that will include a compressed version of the digital photograph; thus, an output file is opened (i.e., created) and named "George's Birthday_Jpeg_Lipon.exe."

Next, the system configures the open output file as a self-extracting file so that the file may be automatically decompressed when selected for viewing by the grandparents. This is accomplished by adding a decompression engine to the open output file. Because the universal self-extracting system knows that the JPEG file will be compressed later using a dictionary compression method, and because such methods operate by replacing every occurrence of a particular string of symbols with a token that indexes into a dictionary, the decompression engine is written (i.e., copied) to the open output file before compression occurs. It is to be understood that the decompression engine could also be written to the open output file after compression occurs. Resource data, such as an icon to be associated with the final universal self-extracting file, is also attached to the open output file at this stage.

The open output file is next configured to automatically launch the digital photograph with the application software appropriate for viewing digital photographs, such as Microsoft® Photo Editor. This is accomplished by writing computer code to the open output file that will, upon execution of the universal self-extracting file by the grandparents, call the operating system of the grandparents' computer to determine what application software is registered with the operating system as being the appropriate software for displaying JPEG files.

Finally, the systems and methods prepare a header file portion and compress the digital photograph using a compression method, such as a dictionary method. The header file portion, which contains information about the file being compressed, is written to the open output file. The information contained in the header file portion may include, for example, the name of the original file (i.e., George's Birthday.jpeg), the file size of the original file, etc. Next, using a compression algorithm such as LZ77, the compression method replaces every occurrence of a particular string of symbols with a token that corresponds to that particular string of symbols, thereby shortening or compressing the actual file data. The compressed image of the digital photograph is then written to the open output file as uncompressed literals (symbols or strings of symbols with no token corresponding to the symbol or string of symbols) and tokens, and the dictionary is dynamically created based on the symbols or strings of symbols encountered in the input file. After the file data has been compressed, the header file portion is updated with additional information about the compressed file data, such as the size of the compressed file data. The open output file is closed, and the resulting universal self-extracting file (i.e., George's Birthday_Jpeg_Lipon.exe) is displayed in text window 504. George's parents may now prepare an email using their email software and attach the universal self-extracting file to the email being sent to George's grandparents.

After the grandparents receive the email, with the attached universal self-extracting file, they may view the digital photograph of George's birthday by executing (i.e., double clicking) the universal self-extracting file.

Once executed, the universal self-extracting file is automatically decompressed using the decompression engine that comes with the self-extracting file and launched with the appropriate software on the grandparents' computer for viewing digital photographs, such as Microsoft® Photo Editor. Decompression of the universal self-extracting file is accomplished by replacing the tokens inserted during the compression method with string of symbols corresponding to the particular token, thereby restoring the compressed JPEG file to its original image. The restored file is saved as a temporary file with the same name as the original file, i.e., "George's Birthday.jpeg." The systems and methods next send the decompressed file (George's Birthday.jpeg) to the operating system of the grandparents' computer, and the operating system determines, based on the file extension portion of the filename, what application software is registered as the appropriate software for displaying JPEG files. For example, Microsoft® Photo Editor or another application may be the program registered with the operating system as being the appropriate software for working with ".jpeg" files. Thus, if the registered application for working with ".jpeg" files is Microsoft® Photo Editor, the digital photograph (i.e., George's Birthday.jpeg) will next be automatically displayed for viewing in Microsoft® Photo Editor.

Although this section makes reference to various implementation-specific details of the independent application software embodiment, these details are provided in order to fully illustrate one embodiment of the invention, and not to limit the scope of the invention.

VI. Conclusion

Although this invention has been described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A computer-implemented method for creating a self-extracting file, the method comprising:
   receiving, by the computer, an input file to be used in creating a self-extracting file; and
   creating, by the computer, a self-extracting file using the input file, wherein the input file is configured to be automatically launched upon execution of the self-extracting file.

2. The method of claim 1, wherein the received input file has an associated filename and wherein a filename for the self-extracting file is configured to be automatically generated based in part on the associated filename of the received input file.

3. A computer-implemented method for creating a self-extracting file from an associated input file, wherein the associated input file is automatically launched upon execution of the self-extracting file, and wherein a user is not required to separately choose a data compression method, create a compressed archive using the chosen compression method, select an input file to be launched upon decompression of the compressed archive, and create a self-extracting file from the compressed archive, the method comprising:
   receiving, by the computer, an input file to be used in creating a self-extracting file, wherein the file is one of a plurality of file types; and
   creating, by the computer, a self-extracting file from the input file, wherein the input file is configured to be automatically launched upon execution of the self-extracting file.

4. The method of claim 3, further comprising generating a filename for the self-extracting file, wherein the generated filename is based on a filename associated with the input file.

5. A computer-implemented method for creating a self-extracting file, the method comprising:
    receiving, by the computer, a user selection of an input file to be used in creating a self-extracting file, wherein the input file is of any file type; and
    automatically creating, by the computer, a self-extracting file configured to automatically launch the received input file responsive to execution of the self-extracting file.

6. The method of claim 5, wherein the creation of the self-extracting file comprises:
    opening an output file;
    attaching a decompression engine to the output file, wherein the decompression engine is capable of decompressing compressed data to a temporary file;
    attaching a loader to the output file, wherein the loader configures the output file so as to automatically launch the temporary file after execution of the self-extracting file; compressing the received input file according to a data compression method; attaching an archive header including information about the compressed input file; and
    closing the output file, wherein the closed output file is the self-extracting file.

7. The method of claim 6, wherein the data compression method is the same method for all received input files.

8. The method of claim 6, wherein the data compression method is determined based on the file type of the received input file.

9. The method of claim 6, wherein the loader attached to the output file depends on the file type of the input file.

10. The method of claim 6, wherein the loader automatically unloads the temporary file.

11. The method of claim 6, further comprising attaching an unloader to the output file to automatically unload the temporary file.

12. The method of claim 11, wherein the unloader performs cleanup processes on the temporary file.

13. A computer-implemented method for creating an executable file, comprising:
    creating, by the computer, a self-extracting file from an input file, wherein the input file is one of a plurality of file types; and
    automatically selecting, by the computer, a loader based on the input file's type; and
    wherein the input file will be automatically launched upon execution of the self-extracting file.

14. A computer-implemented method of creating a self-extracting file comprising:
    displaying, by the computer, a first frame used to allow a user to specify an input file to be converted to a self-extracting file;
    receiving, by the computer, the input file specified by the user, wherein the received input file is automatically configured as a self-extracting file, and wherein the input file is automatically launched upon execution of the self-extracting file; and
    displaying, by the computer, a second frame, wherein the second frame includes a link related to the self-extracting file created from the user specified input file.

15. A system for creating a self-extracting file comprising:
    a receiving module configured to receive an input file, wherein the input file received is one of a plurality of file types and wherein the input file includes an associated filename;
    a naming module configured to create and name an output file, wherein the output filename is generated from the associated filename of the input file and wherein the naming module receives the input file from the receiving module;
    a self-extracting module configured to transform the output file into a executable file configured to launch the input file upon execution of the executable file, wherein the self-extracting module receives the input file and the output file from the naming module; and
    a compressing module configured to compress the input file and attach the compressed input file to the executable file, wherein the compressing module receives the input file and the executable file from the self-extracting module;
    wherein each module is embodied in hardware, in firmware, or in a plurality of computer-executable instructions stored in one or more non-transitory computer-readable media executable by one or more processors.

16. The system of claim 15, wherein the executable file is further configured to perform unload processes.

17. A system for creating a self-extracting file from an associated input file, wherein the associated input file is automatically launched upon execution of the self-extracting file, and wherein a user is not required to separately choose a data compression method, create a compressed archive using the chosen compression method, select an input file to be launched upon decompression of the compressed archive, and create a self-extracting file from the compressed archive, the system comprising:
    a first module for receiving a user selection of an input file to be compressed, wherein the input file is one of a plurality of file types;
    a second module for compressing the received input file according to a data compression method; and
    a third module for creating an executable file from the compressed input file, wherein the input file will be automatically launched upon execution of the executable file.

18. One or more non-transitory computer-readable media having a plurality of computer-executable instructions stored thereon which, when executed by one or more processors, cause the one or more processors to:
    provide a compressed input data portion corresponding to an input data file, the compressed input data portion including data compressed according to a preselected data compression method;
    provide an archive header portion, wherein the archive header portion includes information about the compressed input data portion; and
    provide a self-extracting stub portion, wherein the self-extracting stub portion is automatically attached to the compressed input data portion and the archive header portion, and wherein the self-extracting stub portion includes a decompression engine to decompress the compressed input data portion, and a loader operable to launch the decompressed input data portion with appropriate application software for handling the input data file.

19. A computer-implemented method for creating an executable file, the method comprising:
  receiving, by the computer, an input file to be used in creating an executable file, wherein the input file is one of a plurality of file types; and
  creating, by the computer, an executable file using the received input file, wherein the executable file includes a compressed copy of the input file, and wherein the compressed copy of the input file is automatically decompressed and launched upon execution of the executable file.

20. A computer-implemented process for producing a computer file, the process comprising:
  receiving, by the computer, an input file;
  automatically opening, by the computer, an output file;
  automatically adding, by the computer, a decompression engine to the output file for decompressing compressed data;
  automatically adding, by the computer, loader code to the output file for launching the input file with the appropriate application software for handling the input file;
  automatically adding, by the computer, an archive header to the output file, wherein the archive header includes information relating to the input file;
  automatically compressing, by the computer, the input file according to a data compression method;
  automatically updating, by the computer, the archive header to include information about the compressed input file; and
  automatically closing, by the computer, the output file.

21. A product produced by a computer-implemented process for producing a computer file, the process comprising:
  receiving, by the computer, an input file;
  automatically opening, by the computer, an output file;
  automatically adding, by the computer, a decompression engine to the output file for decompressing compressed data;
  automatically adding, by the computer, loader code to the output file for launching the input file with the appropriate application software for handling the input file;
  automatically adding, by the computer, an archive header to the output file, wherein the archive header includes information relating to the input file;
  automatically compressing, by the computer, the input file according to a data compression method;
  automatically updating, by the computer, the archive header to include information about the compressed input file; and
  automatically closing, by the computer, the output file.

22. A computer-implemented method for creating an executable file, the method comprising:
  receiving, by the computer, an input file to be used in creating an executable file, wherein the input file is one of a plurality of file types; and
  creating, by the computer, an executable file using the received input file, wherein the executable file comprises:
    a compressed input data portion including data compressed according to a data compression method;
    an archive header portion including information about the compressed input data portion; and
    a stub portion, wherein the stub portion is automatically attached to the compressed input data portion and the archive header portion, and wherein the stub portion includes a decompression engine to decompress the compressed input data portion and a loader to launch the decompressed input data portion.

23. A computer-implemented method for using an executable file, the method comprising:
  creating, by the computer, an executable file from an input file, wherein the executable file includes a compressed copy of the input file, and wherein the executable file includes code to decompress and to load the compressed input file; and
  executing, by the computer, the executable file to decompress the compressed copy of the input file and launching the decompressed input file with appropriate application software.

24. A computer-implemented method for creating a self-extracting file, the method comprising:
  receiving, by the computer, an input file to be used in creating a self-extracting file;
  creating, by the computer, a self-extracting file using the input file and automatically launching the input file upon execution of the self-extracting file.

25. The method of claim 24, wherein the input file is an executable routine and wherein a function of the executable routine is called upon loading of the executable routine.

26. The method of claim 24, wherein the input file is a dynamic link library file.

* * * * *